Nov. 14, 1967   A. YANOWITZ   3,352,318
CHECK VALVE
Filed Dec. 22, 1966

ARTHUR YANOWITZ   INVENTOR

BY Donald F. Wohlers

PATENT ATTORNEY

United States Patent Office 3,352,318
Patented Nov. 14, 1967

3,352,318
CHECK VALVE
Arthur Yanowitz, Cranford, N.J., assignor to Esso Research and Engineering Company, a corporation of Delaware
Filed Dec. 22, 1966, Ser. No. 604,020
6 Claims. (Cl. 137—484.2)

ABSTRACT OF THE DISCLOSURE

An airfoil section imparts an aerodynamic lifting force to a butterfly valve to overcome its quiescent static unbalance to cause the valve to assume a minimum pressure loss configuration during fluid flow thereover. The valve cross-section itself may be an airfoil, or an auxiliary airfoil may be attached to a conventional flat plate butterfly valve. Stop means are provided to prevent movement of the valve past its minimum pressure loss orientation.

---

The present invention relates in general to valves and in particular to improvements in butterfly-type check valves or dampers. More particularly, the invention relates to an improved check valve for a gas duct which is quick to close by gravity upon zero or negative pressure differential while presenting a minimum resistance to the air flow and therefore, minimum pressure drop thereacross under a positive pressure differential.

In many instances of air or other gas flow through ducts between a pressure source such as a fan and a point of utilization such as a furnace or boiler, it is desirable to have a butterfly valve therebetween so that, should the fan or blower cease to force air through the duct for any reason, the hot gases of combustion from the boiler at the other end of the duct would be prevented from backing into the fan and damaging it. For this use, a butterfly-type check valve which is normally statically unbalanced to be in a closed position is conventionally used. However, the presence of a conventionally statically unbalanced check valve which will automatically close in the presence of zero or negative pressure differential across it will, by virtue of its configuration, inherently impose a pressure drop upon the flowing fluid in the positive direction, i.e. toward the point of utilization. Any unnecessary pressure drop across the check valve during normal operation therefore is detrimental to the fan design which necessarily must be sized to overcome this pressure loss. It is an object of the present invention to avoid this unnecessary pressure loss during normal operation of a conventional butterfly valve without sacrificing in any way whatsoever its ability to shut off the duct upon a loss of fan pressure—or in other words, during conditions of zero or negative pressure differential across the valve.

In accordance with one form of the invention, a small offset airfoil section on the under side of the trailing edge of the butterfly valve is employed. As the air flow passes across the airfoil, it will impart an aerodynamic lifting force to the valve which will overcome its quiescent static unbalance to cause the butterfly to assume a substantially horizontal position in its minimum pressure loss configuration. Obviously, without the use of this airfoil section, the inherent unbalance of the butterfly valve would prevent it from ever reaching the completely horizontal, or least pressure differential, orientation.

In another form of the invention, the entire butterfly valve is shaped in cross-section as an airfoil to provide a net center of lift at a point displaced relative to the pivot axis of the airfoil section so that a counter torque is produced to effectively cancel out the static torque on the pivoted airfoil section normally tending to rotate it into a closed position.

Accordingly, it is the principal object of the present invention to produce a low pressure drop check valve for a duct containing a flowing fluid.

Another object of the invention is to provide a novel and simple improved check valve arrangement which will close due to its inherent static unbalance with a zero or negative pressure differential fluid flow condition thereacross and will exhibit a minimum pressure drop in a positive or normal direction of fluid flow thereacross.

Another object of the invention is to provide a novel butterfly valve-type check valve arrangement wherein the duct closure member itself is in the form of an airfoil.

These and other objects and advantages of the invention will become apparent and the invention will be fully understood from the following description and drawings in which.

Figure 1:
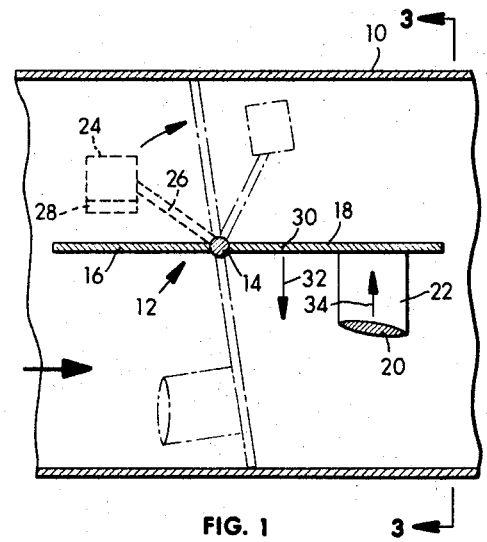
FIG. 1 is a fragmentary cross-section of a duct showing the principal features of one form of the invention.
Figure 2:
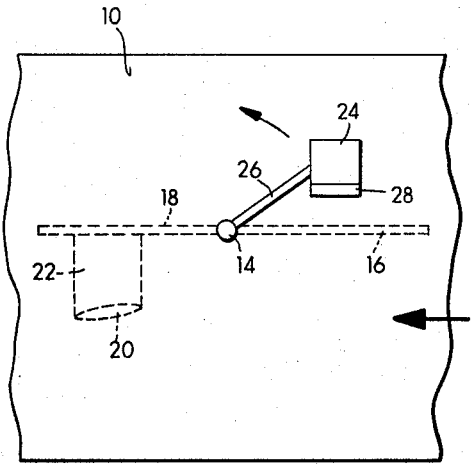
FIG. 2 is a rear elevation view of the structure of FIG. 1.

Referring to the drawings in particular, a generally horizontal duct 10 for conducting a forced fluid such as air or any other gas in the direction of the arrow includes a pivoted butterfly check valve 12. The valve 12 is supported upon a central pivot 14 and includes a leading edge portion 16 and a trailing edge portion 18 of slightly greater area than the leading portion 16. The vertical positioning of the pivot 14 is slightly above the center of the duct so that in the closed position of the valve 12, the leading portion 16 and the trailing portion 18 are effective to block off the flow of fluid in the duct.

Figure 3:
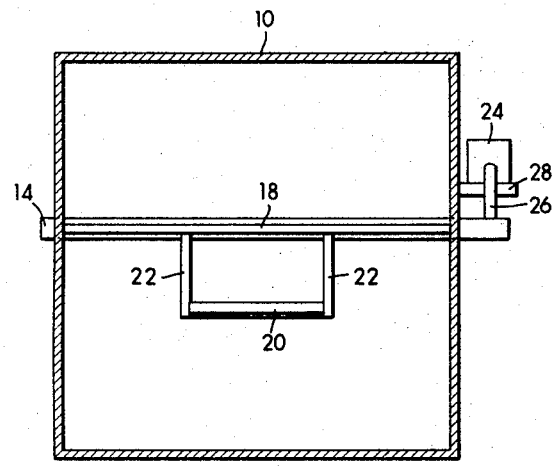
FIG. 3 is an end view of the duct looking in the direction of the arrows 3—3 of FIG. 1.

A pair of vertically disposed struts 22 which may be of a streamlined cross-section depend downwardly from the under side of the trailing edge 18. The struts 22 are spaced apart, and across the lower end thereof support an airfoil section 20. Referring to FIG. 3, it may be seen how the central pivot 14 extends at one end appreciably beyond the duct wall and includes a counterweight designated 24 attached thereto by an arm or bracket 26. A stop member 28 projects outwardly from the exterior of the duct 10 to cooperate with the under side of the weight 24 so that, upon maximum flow of gas in the duct, the butterfly valve will not open beyond the position shown in FIG. 1. Accordingly, any excess of lift produced by the airfoil 20 will not cause an over-rotation of the valve about its pivot point 14. As may readily be seen from inspection of FIG. 1, the static center of gravity or net center of gravity of the pivoted assembly is disposed well to the right of the pivot center 14 and at a point designated 30. Accordingly, the static tendency of the assembly is to rotate clockwise about the pivot 14 in the direction of the arrow 32, into a normally closed position. The closed position would occur whenever a zero pressure differential existed across the valve assembly such as would be the case during shutdown or failure of the fan, not shown, which forces air through the duct. However, during normal operation of the invention, the airfoil 20 is effective to produce a lifting force under dynamic conditions substantially equal and opposite to the static unbalance of the self-closing valve so that a minimum pressure drop is exhibited during normal operation.

Figure 4:
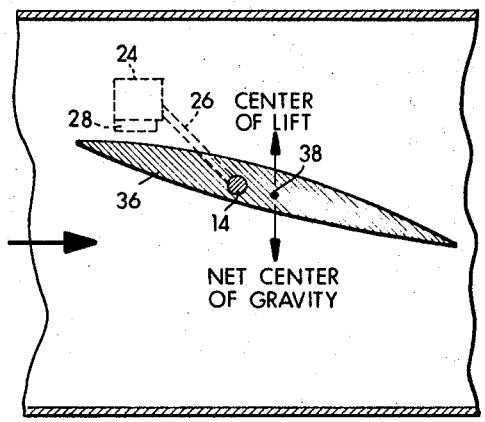
FIG. 4 is a cross-sectional view similar to FIG. 1 showing another form of the invention.

Referring to FIG. 4, another embodiment of the invention is shown wherein elements having like functions to those shown in FIG. 1 have been designated with like numerals. FIG. 4 includes a butterfly-type valve 36 having a cross-section in the form of an airfoil. The net center of gravity of the rotating valve assembly in its static state is located approximately at the point 38. As in the case with the arrangement of FIG. 1, this static imbalance of the assembly creates a normal clockwise torque about the pivot 14, tending to close the butterfly whenever a zero or negative pressure differential occurs. The center of lift of the airfoil 36 is also designed to be disposed to the right of the pivot 14 at the point approximating the arrow shown. As may readily be seen, this center of lift creates a force in opposition to the normal gravitational force to substantially cancel out the static unbalance of the valve assembly in the dynamic state.

Those skilled in the art will readily appreciate that numerous modifications of the structures shown may be made without departing from the spirit of the invention. For instance, while the pivot point for the butterfly has been shown as being intermediate its total area, it could just as well be pivoted at its leading edge with the pivot point located at the uppermost boundary of the duct. Alternatively, the direction of lift could just as readily be selected to be in a downward direction with the airfoil section of FIG. 1 located on the leading edge 16 to the left of the pivot point rather than in the position shown. Those skilled in the art will readily appreciate the various modifications which may be made to the specific structure shown without departing from applicant's invention.

While several specific embodiments of the invention have been shown and described in detail to illustrate the application of the inventive principles, it will be understood that the invention may be embodied otherwise without departing from such principles.

What is claimed is:

1. A low pressure drop check valve for a gas duct comprising a duct closure member, pivot means supporting said closure member within said duct, said member being statically unbalanced upon said pivot means so as to be in a normally closed position when no gas is flowing in said duct, and airfoil means mounted upon said closure member responsive to flow of gas in said duct for providing a force in opposition to the static unbalance of said closure member to thereby place said closure member in substantially dynamic balance when gas is flowing in said duct, and stop means cooperative with said pivot means for limiting the degree of opening of said closure member.

2. Apparatus in accordance with claim 1 wherein said pivot means divides said closure member into a smaller first portion and a larger second portion, said airfoil means being mounted on the larger second portion.

3. Apparatus in accordance with claim 2 including counterweight means attached to said pivot means exterior of said duct for partially offsetting the weight of said airfoil means.

4. Apparatus in accordance with claim 3 wherein said stop means includes a portion exterior of said duct for contacting said counterweight means.

5. A low pressure drop check valve for a duct having a fluid flowing therethrough comprising a duct closure member, pivot means supporting said closure member within said duct, said closure member having a net center of gravity displaced downstream of said pivot means, said closure member being substantially an airfoil in cross-section and having a center of lift disposed from the axis of said pivot means to thereby provide a torque about said pivot means when fluid is flowing in said duct in opposition to the static unbalance of said closure member, and stop means cooperative with said pivot means for limiting the degree of opening of said closure member.

6. Apparatus in accordance with claim 5 including counterweight means attached to said pivot means exterior of said duct for controlling the displacement of the net center of gravity from said pivot means.

References Cited

UNITED STATES PATENTS

| 2,725,895 | 12/1955 | Chanrion et al. | 137—484.2 X |
| 3,176,704 | 4/1965 | De Palma | 251—305 X |

FOREIGN PATENTS

| 499,093 | 12/1927 | Germany. |
| 931,670 | 7/1946 | France. |
| 1,382,288 | 11/1963 | France. |

M. CARY NELSON, *Primary Examiner.*

R. J. MILLER, *Assistant Examiner.*